United States Patent [19]

Barbic et al.

[11] Patent Number: 4,823,306

[45] Date of Patent: Apr. 18, 1989

[54] TEXT SEARCH SYSTEM

[75] Inventors: Federico Barbic, Bergamo, Italy; David M. Choy, Los Altos, Calif.

[73] Assignee: International Business Machines Corporation, Armonk, N.Y.

[21] Appl. No.: 85,110

[22] Filed: Aug. 14, 1987

[51] Int. Cl.$^4$ .............................................. G06F 15/40
[52] U.S. Cl. .................................. 364/900; 364/974.6
[58] Field of Search ... 364/200 MS File, 900 MS File

[56] References Cited

U.S. PATENT DOCUMENTS

| | | | |
|---|---|---|---|
| 3,400,371 | 9/1968 | Amdahl et al. | 364/200 |
| 4,276,597 | 6/1981 | Dissly et al. | 364/200 |
| 4,434,475 | 2/1984 | McCaskill et al. | 364/900 |
| 4,775,956 | 10/1988 | Kaji et al. | 364/900 |

OTHER PUBLICATIONS

C. Faloutsos, "Access Methods for Text", ACM Computing Surveys, vol. 17, #1, Mar. 1985, pp. 49-74.
D. Tsichristzis et al., "Message Files", ACM Trans. on Office Information Systems, vol. 1, #1, Jan. 1983, pp. 88-98.
E. L. Lawler, "Combinatorial Optimization: Networks and Matroids", Holt, Rinehart U Winston, 1976, pp. 200-207.
A. V. Aho et al., "Data Structures and Algorithms", Addison-Wesley Publishing Co., pp. 188-193.

Primary Examiner—Thomas M. Heckler
Attorney, Agent, or Firm—Simon K. Lee

[57] ABSTRACT

In a searching for library documents that match the content of a given sequence of query words, a set of equivalent words are defined for each query word along with a corresponding word equivalence value assigned to each equivalent word. Target sequences of words in a library document which match the sequence of query words are located according to a set of matching criteria. The similarity value of each target sequence is evaluated as a function of the corresponding equivalence values of words included therein. Based upon the similarity values of its target sequences, a relevance factor is then obtained for each library document.

20 Claims, 2 Drawing Sheets

TEXT SEARCH SYSTEM

TECHNICAL FIELD

This invention relates to information retrieval systems. More particularly, this invention relates to method and apparatus for locating library documents the content of which matches the content of a sequence of query words in accordance with a given set of matching criteria, as well as evaluating the relevance of these documents.

BACKGROUND OF THE INVENTION

Recent advance in mass storage technology and data base management techniques has increased the feasibility of storing vast amount of documents in data processing systems, thereby providing an opportunity of utilizing the processing power of these systems in facilitating the retrieval of the stored documents.

Descriptions of representative prior art search systems can be found in C. Faloutsos, "Access Methods for Text", ACM Computing Surveys vol. 17, no. 1, March 1985, pp. 49-74; D. Tsichristzis et al, "Message Files", ACM Trans. on Office Information Systems, vol. 1, no. 1, January 1983, pp. 88-98; and G. Salton, "The SMART Retrieval System—Experiments in Automatic Document Processing, Prentice Hall, 1971.

Search commands provided by most prior art text search facilities typically include a set of query words, together with some specifications defining their contextual relationships. A library document is retrieved if it contains words that are identical or equivalent to the query words and the occurrences of which satisfy the specified relationships. In these prior art search facilities, equivalent words are usually given the same degree of significance (weight). The contextual relationships are, basically, defined only in terms of Boolean logic and adjacency operators. As a result, the flexibility provided by these facilities for expressing a desired search content is usually very limited so that a given search may not be as accurate as one would desire.

An object of this invention is to provide a text search facility that allows users to more accurately and flexibly define the scope within which documents with alternative expressions of a desired content will be retrieved; by allowing its users to assign different weights to equivalent words, and by allowing its users to define structures of words which the users consider acceptable. To further enhance flexibility, it is another object of this invention to provide a search facility that can evaluate, based upon user-provided criteria, a value to represent the relevance of a document. Moreover, since the relevance of a document depends on application, user and temporal factors, it is a further object of this invention to allow users to specify how relevancy is to be measured, and also to provide a search facility whereby located documents can be ranked in accordance with their respective relevance.

SUMMARY OF THE INVENTION

The invention disclosed herein is a method and an apparatus for retrieving, from among a library of more than one document, those that match the content of a sequence of query words. The method comprising the steps of: defining a set of equivalent words for each query word and assigning to each equivalent word a corresponding word equivalence value; locating target sequences of words in a library document that match the sequence of query words in accordance with a set of matching criteria; evaluating a similarity value for each of said target sequences words as a function of the corresponding equivalence values of words included therein; and obtaining a relevance factor for the library document based upon the similarity values of its target sequences.

DESCRIPTION OF THE PREFERRED EMBODIMENT

Figure 1A:
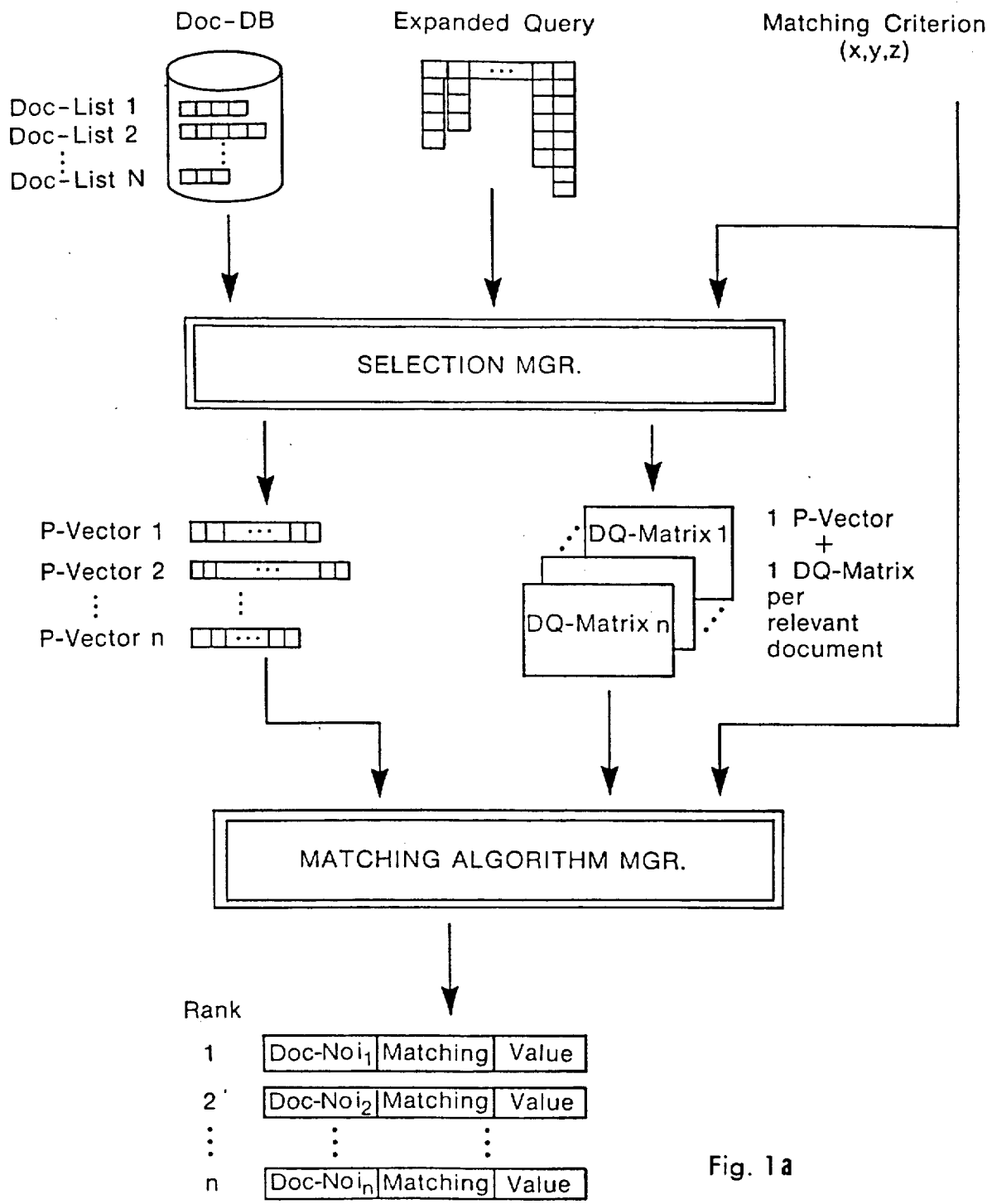
FIGS. 1a and 1b give an overview of the retrieval process according to the preferred embodiment of this invention.

FIG. 1a is a diagram giving an overview of the document retrieval system according to the present invention. The preferred embodiment is implemented in a data processing complex that comprises a general purpose central processing unit (CPU) connected to a plurality of secondary devices which include external storage devices and Input/Output equipment. An example of the CPU is the IBM System/360 or IBM System/370 described in U.S. Pat. No. 3,400,371 by G. M. Amdahl et al, entitled, "Data Processing System", or in IBM System/370 Principles of Operation, IBM Publication GA22-7000-6. The complex is operating under the control of an operating system, such as the IBM System/360 or System/370, operating in conjunction with the IBM Information Management System/Virtual Storage (IBM IMS/VS). System/360 and System/370 are respectively described in IBM publications GC 28-0661 and GC 20-1800. IBM IMS/VS is described in IB publication SH20-9145-0.

Figure 1B:
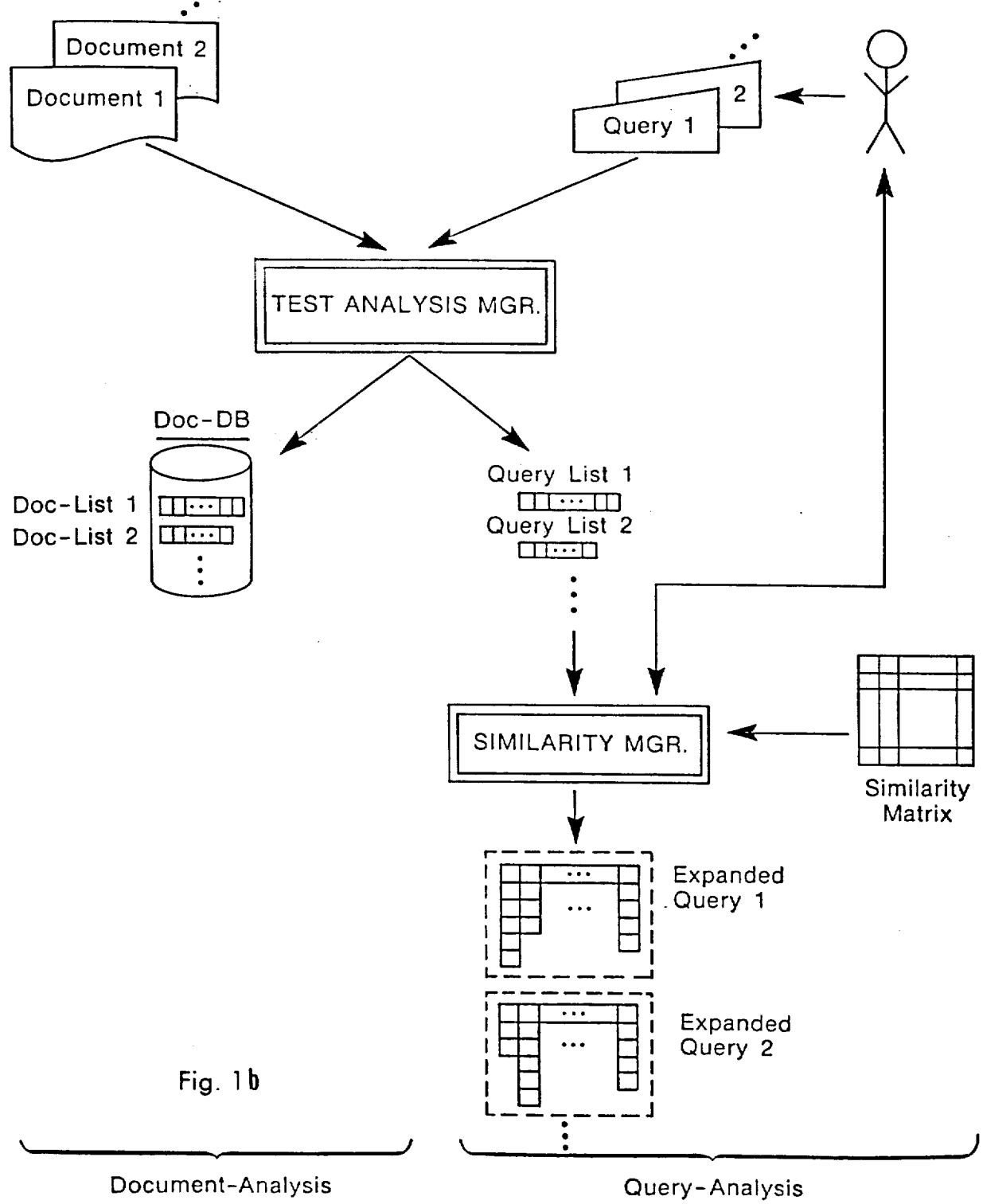

In FIG. 1b, there is shown a plurality of library text documents, usually stored in the secondary storage devices of the complex. Each library text document is processed by a Text Analysis Manager to generate a word list (called Doc-List) that is added to a collection called DOC-DB. In generating a Doc-List, the Text Analysis Manager eliminates stop words and punctuation marks, and transforms every word into its canonical form. One implementation of DOC-DB is to have an inverted index structure defined on a vocabulary, as shown in Table 1, in which each word in the vocabulary is represented by a record comprising a set of identifiers (Doc-List—ID's) pointing to the Doc-Lists that contain the word, together with addresses of the positions (POS-i) in a Doc-List where the word occurs.

A document retrieval process is initiated upon the receipt of a search command which comprises a sequence of query words. The search command may be entered directly by a user or indirectly from a user-friendly interface such as a dialogue system, a menu system, a natural language system, or an expert system. The query words $(q_l, \ldots, q_m)$ are processed by the Text Analysis Manager to generate a word list, denoted as a Query-List, Q.

Based upon a set of word similarity information, the Query-List is expanded by the Similarity Manager into a set of vectors $QS(q_j)$. The similarity information may be part of the search command. However, it is obvious that it may also be predefined and stored in the system.

According to this invention, equivalent words refer to words between which an application has assigned a acceptable relevance. By way of examples, an application may partition the vocabulary into equivalence classes where words of one class are defined as equivalent to each other; it may consider the number of basic editing operations (e.g. inserting or deleting a character) that are necessary to obtain one word from the other, without giving any significance to the meaning of the words; or it may give a measure of the closeness in meanings of each pair of words.

In addition to defining a set of equivalent words ($w_{jk}$'s) for each query word ($q_j$), the similarity information includes a word equivalence value ($s_{jk}$) assigned to the corresponding equivalent word $w_{jk}$.

The Similarity Manager converts each word ($q_j$) in the Query-list into a set of vectors, QS($q_j$). Each element QS($q_j$) comprises the word identifier (QS_WORD) of a $w_{jk}$ and its corresponding word equivalence value (QS_SIMILARITY) $s_{jk}$. The QS($q_j$)s are concatenated to form an overall vector QS_VECT. QS_VECT has a pointer, QS_PTR[j], pointing to the offset of a QS($q_j$) (i.e. QS_PTR[j]=the index of the first element of a QS($q_j$) in QS_VECT). A high-level language structure of QS-VECT is given Table 2a.

A search command also includes a set of matching criteria. There are three matching criteria implemented in this preferred embodiment. The first matching criterion, x, regulates the form in which a sequence of query words is mapped onto the words of a document (i.e. the type of inclusion). Three types of inclusion are recognized:

An unordered inclusion, (x=1), exists if a word sequence L1 can be mapped onto distinct words of a word sequence L2 with no constraint being put on the ordering of the words. As an example, an unordered inclusion of L1 on L2 exists if L1 is a word sequence CBD (each letter, C,B, and D represents a word) and L2 is a word sequence ABCD.

An ordered inclusion (x=2) exists if, in addition to satisfying the unordered inclusion, the order of the words in sequence L2 is the same as in L1 (e.g. L1 is a word sequence of ACD and L2 is a word sequence ABCD).

A contiguous inclusion (x=3) exists if, in addition to an ordered inclusion, all words in L2 mapped by L1 are consecutive (e.g. L1 is a word sequence of BCD and L2 is a word sequence of ABCD).

The second matching criterion, y, concerns the relevance of spread in a sequence of document words that match a query word sequence. This criterion takes into account the word span of the sequence and is defined as the length of the sublist in L2 which satisfies a given inclusion of L1. For example, let L1'=ACD, L1"=ABE, and L2=ABCDE. There is an ordered inclusion of both L1' and L1" on L2, but the spread for L1' is four words (ABCD) and the spread for L1" is five words (ABCDE). In most situations a match is considered better when its spread is smaller. Thus, the inclusion of L1' on L2 is considered to be stronger than the inclusion of L1" on L2. The spread requirement includes a maximum allowable span and a weighting of the relevance measured by the span of a matched sublist.

The third matching criterion, z, relates to the relevance of the completeness of a match. If a complete match (z=1) is specified, then only documents having a sequence of words which completely match the query word sequence are retrieved. Otherwise, for incomplete match (z=0), documents are retrieved even if the content of a document matches only a subset of the query words. The incomplete match requirement includes a minimum number of matched words and a weighting of the relevance measure by the actual number of matched words.

Based upon these three matching criteria, a collection of similarity values $S_{xyz}$ would exist. Each $S_{xyz}$ represents the degree of similarity between the query word sequence and a corresponding word sequence which matches it in accordance with a given set of matching criteria, xyz. A list of all possible $S_{xyz}$ is given in Table 3.

Given two sequences of words, $L1=u_1, \ldots, u_m$, $L2=v_1, \ldots, v_n$, and a word equivalence value $e(u_i,v_j)$ between a word $u_i$ in L1 and a word $v_j$ in L2. The general formula for calculating a similarity value $S_{xyz}$ is:

$$S_{xyz}(L1,L2) = \operatorname*{Max}_{f_{xz}} \left( (1/d(f_{xz})) \sum_{i=1}^{m} e(u_i, v_{f_{xz}(i)}) \right)$$

where $f_{xz}(i)$ = position of the word v that matches the word $u_i$ $$d(f_{xz}) = m, \text{ if } y = 1$$
$$= \max(m, \text{ spread of } f_{xz}), \text{ if } y = 2.$$

However, an additional weighting factor g may be combined with $e(u_i, v_j)$ to form $s(u_i, v_j)$ so that $$S_{xyz}(L1,L2) = \operatorname*{Max}_{f_{xz}} \left( (1/d(f_{xz})) \sum_{i=1}^{m} s(u_i, v_{f_{xz}(i)}) \right)$$

with $s(u_i, v_{f_{xz}(i)}) = g_{f_{xz}(i)} * e(u_i, v_{f_{xz}(i)})$ g may represent a weighting factor depending on the position within the document of the matched word $v_i$.

The more detailed forms of $S_{xyz}$ are listed in Table 4.

The sequence of expanded query word sets QS($q_j$), together with a given set of matching criteria, are received by the Selection Manager to select those documents in DOC-DB that are potentially relevant. However, only a subset of documents from DOC-DB may be received by the Selection Manager. This subset of documents is preselected from DOC-DB based upon optional input information (e.g. all documents stored before the year 1970).

An assumption is made that a document is relevant if it contains at least one word similar to a query word. For each potentially relevant Doc-list, the Selection Manager derives a position vector P representing a sequence of positions $p_l, \ldots, p_n$ of those Doc-list words that have a non-zero similarity value with some query words, $p_i$ thus denotes the position of the i-th Doc-list word that has a non-zero similarity with some query words.

The Selection Manager also generates a Document Query Matrix (DQ-matrix). Each element ($dq_{ij}$) in the DQ-matrix contains the similarity value ($s_{jk}$) between the $p_i$-th Doc-list word ($dp_i$) and the j-th query word ($q_j$). Every row of the DQ-matrix would have at least one non-zero element since, if this were not true, the Doc-list word $dp_i$ would have null similarity with all the query words and would not have been selected by the Selection Manager. On the other hand, if each row of the DQ-matrix has at most one non-zero element, the matrix is referred to as separable, otherwise the matrix is referred to as general. Moreover, if the DQ-matrix has only binary values, the DQ-matrix is referred to as binary, otherwise the matrix is referred to as continuous.

The above described selection procedure performed by the Selection Manager can be summarized in the pseudo code list in Table 5.

One way of implementing the DQ-matrix is by storing non-zero elements of each row along with their respective positions within the row. An element representing a non-zero element in the i-th row of the DQ-matrix would contain an index and the element $dq_{ij}$. A vector DQ_VECT is formed by concatenating the rows of the DQ-matrix. A high level language representation of the DQ-matrix is given in Table 2b.

The P-vector and the DQ-matrix are received by the Matching Algorithm Manager to select a matching algorithm, $A_{xyz}$, to solve a particular $S_{xyz}$. To improve efficiency, each $S_{xyz}$ is further sub-divided, according to whether the DQ-matrix is separable or general, and whether it is binary or continuous, into four subcombinations. The four subcombinations are denoted as:

$A^a_{xyz}$=separable and binary $A^b_{xyz}$=separable and continuous $A^c_{xyz}$=general and binary p1 $A^d_{xyz}$=general and continuous Before describing the algorithms for solving the similarity values, a general method is described herein for translating an algorithm which is used for solving similarity values $S_{x1z}$ having a no-spread criterion, to an algorithm $S_{x2z}$ wherein spread consideration is required (other criteria being identical):

Given an algorithm $A^t_{x1z}$ where spread is not required, the similarity value $S^t_{x2z}$ for the analogous matching criteria x2z in which spread is required can be obtained by $A^t_{x1z}$ for each substring of the Doc-list and weighing the optimal match by the spread. The optimal weighted matching value would form the expected result. In other word, $A^t_{x2z} = R(A^t_{x1z})$, where R denotes the reduction algorithm. An implementation of R is listed in Table 6.

The different algorithms for solving similarity values under a particular set of matching criteria are now described. It is understood that although these algorithms are used in this preferred embodiment, other algorithms may similarly be applied.

For similarity value $S_{11z}$ in which the DQ-matrix is separable, the equation can be reduced to:

$$(1/m) \sum_{j=1}^{m} \text{Max}\{dq_{ij} \mid 1 \leq i \leq n\}$$

For matching criteria 111 in which the DQ-matrix is not separable, the problem is exactly a Weight Bipartite Matching Problem and can be solved by the Hungarian Method described in Lawler E. L., "Combinatorial Optimization: Networks and Matroids", Holt, Rinehart and Winston, 1976. A formulation of the weighted bipartite matching problem is: given a complete bipartite graph $G=(S,T,S \times T)$, $|S|=n$, $|T|=m$ and a weight $w_{ij} \geq 0$ for each edge $(s_i, t_j) \in S \times T$, maximize $$\sum_{1 \leq i \leq n, 1 \leq j \leq m} (w_{ij} x_{ij})$$

subject to $$\sum_{j=1}^{m} x_{ij} \leq 1, 1 \leq i \leq n; \sum_{i=1}^{n} x_{ij} \leq 1, 1 \leq j \leq m; x_{ij} \geq 0$$

The Hungarian Method can be applied by defining S and T as indices of elements in the Doc-list and the expanded query word sets, respectively, and for each edge $(i,j) \in S \times T$, by letting $dq_{ij}$ be its weight, i.e. $w_{ij} = dq_{ij}$.

For $S_{112}$ with no separability, the Hungarian method is also used. However, it is necessary to avoid the case in which the maximum match is an incomplete match. In other words, it is necessary to enforce a situation that, if there is at least one complete match, then the maximum match is a complete match. To apply the Hungarian Method, complete matches must be separated from incomplete matches, such that the range $I_{compl}$ of matching values for complete matches is disjoint from the range $I_{incompl}$ of matching values for incomplete matches. Furthermore, the maxima of interval $I_{incompl}$ must be less than the minima of interval of interval $I_{compl}$. This is expressed by the condition that $I_{compl}$ must be greater than $I_{incompl}$, i.e. Min $I_{compl}$ > Max $I_{incompl}$. Thus, if there exists at least one complete match, the Hungarian Method will find it. If there is no one, an incomplete match will be found.

To distinguish between the matching values of complete and incomplete matches, new weights $w'_{ij}$ derived from the old weights $w_{ij}$ by adding the constant value m, i.e., $$w'_{ij} = w_{ij} + m, 1 < i < n, 1 < j < m.$$

This modification preserves the distances between any pair of weights, i.e., $$w'_{ij} - w'_{kl} = w_{ij} - w_{kl}, 1 < i,k < n, 1 < j, 1 < m.$$

Furthermore, this modification satisfies the previously identified condition, because Max $I'_{incompl} = (m-1) \text{Max}\{w'_{ij}\}$ and Min $I'_{compl} = n \text{ Min}\{w'_{ij} = w'_{ij} > 0\}$ To evaluate $S_{12z}$ where the DQ-matrix is separable, two variables MATCH, WEIGHT are defined for storing the actual matching and the weights, i.e., if the j-th Expanded Query word is matched with the i-th Doc-List word, then MATCH[j] = i and WEIGHT[j] = $dq_{ij}$.

A high level language description of the algorithm is given in Table 7. The function FIND_assign(i), used in the algorithm of Table 7 and in algorithms described hereafter, returns the index j of the Expanded Query word which the i-th Doc-List word can be matched to.

The function L(i,j) returns the similarity value $dq_{ij}$ of the i-th element in the Doc-List and the j-th word of the query. It searches in the index interval from DQ_PTR[i] to DQPTR[i+1]−1 of DQ_VECT an element with DQ_INDEX=j and returns the similarity value DQ_VALUE, i.e. $dq_{ij}$. If there is no such element, then the value of zero is returned.

Algorithm $A^{ab}_{122}$ for $S_{122}$ where the DQ-matrix is separable can simply be derived from algorithm $A^{ab}_{121}$.

Algorithms $A^{cd}_{12z}$ can be derived from algorithm $A^{cd}_{11z}$ by applying the reduction algorithm R in Table 6.

$S^{ac}_{211}$ can be solved by formulating it into a Longest Common Subsequence (LCS) problem as follows: given two sequences $s_1 = a_1, \ldots, a_n$ and and $s_2 = b_1, \ldots, b_m$ where $n \geq m$, find a LCS t that satisfies the conditions that (1) t is a subsequence of $s_1$ and (2) t is maximal, i.e. there is no other sequence t' that satisfies (1), and length(t') > length(t). The LCS is well known in the literature and algorithms for solving it haven been known, see, for instance, A. V. Aho et al, "Data Structures and Algorithms", Addison-Wesley, (1983).

For $S^{bd}_{211}$ where the DQ-matrix is not binary, the algorithm $A^{bd}_{211}$ can be reduced to the problem of finding the shortest Path in an acyclic digraph which can be obtained from the DQ-matrix using the algorithm shown in Table 8.

Algorithm DAG uses a function Next(i,j) that accesses the index interval DQ_PTR[i] to DQ_PTR[i+1]−1 in DQ_VECT of the i-th row of the DQ-matrix and returns the smallest DQ_INDEX greater than j. If no such index exists, the function returns 0. This function uses, for each row of DQ, a pointer to the current element of the row in DQ_VECT. This provides an efficient access in sequence to all the elements of each row of the DQ-matrix.

For the evaluation of $S^{ac}_{212}$ where the DQ-matrix is binary, an additional test is performed to check that all the query words have been matched, i.e. the length $l_t$ of the LCS is m.

For $S^{bd}_{212}$, the algorithm is similar to $A^{bd}_{211}$ for the complete case. However, if a complete matching exists, the algorithm must return the maximum complete matching. To achieve this, the problem can be reduced to the Shortest Path Problem, the interval $I_{incompl}$ of matching values for the incomplete matches and the interval $I_{compl}$ of matching values for complete matches must be disjoint, i.e., satisfy the previously identified condition. The necessary modification is analogous to that applied in algorithm $A^{cd}_{112}$.

For similarity values $S_{22z}$, the algorithms are obtained from the algorithms $A_{21z}$ through the reduction algorithm R.

For the contiguous cases $S_{3yz}$, it is not necessary to distinguish between the binary and continuous cases. The basic idea of all four algorithms is to scan a window over the Doc-List. In each iteration, the matching value V of the actual window and the query is computed.

Algorithm $A^{ab}_{311}$ and algorithm $A^{cd}_{311}$ are respectively the same as algorithm $A^{ab}_{312}$ and algorithm $A^{cd}_{312}$. The difference between the algorithms for $S_{311}$ and $S_{312}$ is that in the complete case, only windows of width m are considered, whereas in the incomplete case partial windows at the beginning and the end of the Doc-List must be checked. Thus, the algorithms for the incomplete case are a particular extension of the algorithms for the complete case.

To solve $S_{321}$, a window of width m is scanned over the Doc-List, starting with the first position and stopping at the (n−m)-th position. In each of the (n−m) iterations, the matching value V is computed using function L(i,j). A high level language description of the algorithm is given in Table 9.

Algorithm $A^{abcd}_{311}$ consists of three phases. In the first phase, partial windows at the begin of the Doc-List are considered. In the second phase, total windows of width m in the center are considered, and in the third phase, partial windows at the end of the Doc-List are considered. The array M' is of the same type as array M, and it is used for storing the optimal matching in each phase. A high level language description of the algorithm is given in Table 10.

Although an exemplary embodiment of the invention has been disclosed for purpose of illustration, it will be understood that various changes, modifications and substitutions may be incorporated into such embodiment without departing from the spirit of the invention as defined by the claims appearing hereinafter.

TABLE 1

| Word | DOC-List ID | Structure of the Vocabulary POS | DOC-LIST ID | POS | | |
|---|---|---|---|---|---|---|
| . | . | . | . | . | | |
| . | . | . | . | . | | |
| . | . | . | . | . | | |
| "search" | doc 672 | 10,324 ... | doc 726 | 1,441 ... | ... | record m |
| "text" | doc 411 | 25,121 ... | doc 672 | 13,51 ... | ... | record n |
| . | . | . | . | . | | |
| . | . | . | . | . | | |
| . | . | . | . | . | | |

TABLE 2a

QS_ELEMENT : record QS_WORD : integer;
QS_SIMILARITY : real;
end;
QS_VECT : array [1 ... maxindex] of QS_ELEMENT;
QS_PTR : array [1 ... m] of integer;

TABLE 2b

DQ_ELEMENT : record DQ_INDEX : integer;
DQ_VALUE : real;
end;
DQ_VECT : array [1 ... maxindex] of DQ_ELEMENT;
DQ_PTR : array [1 ... n] of integer;

TABLE 3

| Incomplete/Complete | Spread irrelevant | Weighted by spread |
|---|---|---|
| Unordered | $S_{111}/S_{112}$ | $S_{121}/S_{122}$ |
| Ordered | $S_{211}/S_{212}$ | $S_{221}/S_{222}$ |
| Contiguous | $S_{311}/S_{312}$ | — |

TABLE 4

$$S_{111}(l_1, l_2) = \frac{1}{m} \underset{f_{1z}}{\text{Max}} \left\{ \sum_{i=1}^{m} s(u_i, v_{f_{1z}(i)}) \right\}$$

$$S_{121}(l_1, l_2) = \underset{f_{1z}}{\text{Max}} \left( \frac{1}{d(f_{1z})} \sum_{i=1}^{m} s(u_i, v_{f_{1z}(i)}) \right)$$

$$d(f_{1z}) = \text{Max}\{m, \text{Spread of } f_{1z}\}$$

$$S_{211}(l_1, l_2) = \frac{1}{m} \underset{f_{2z}}{\text{Max}} \left\{ \sum_{i=1}^{m} s(u_i, v_{f_{2z}(i)}) \right\}$$

$$S_{221}(l_1, l_2) = \underset{f_{2z}}{\text{Max}} \left( \frac{1}{d(f_{2z})} \sum_{i=1}^{m} s(u_i, v_{f_{2z}(i)}) \right)$$

TABLE 4-continued $$d(f_{2z}) := \text{Max}\{m, \text{Spread of } f_{2z}\}$$

$$S_{311}(l_1, l_2) := \frac{1}{m} \underset{f_{3z}}{\text{Max}} \left\{ \sum_{i=1}^{m} s(u_i, v_{f_{3z}(i)}) \right\}$$

TABLE 5

```
procedure selection;
begin
for all words in Expanded Query do
    retrieve index record;
for each Doc-List containing at least one word of the Expanded
    Query do create P-vector, DQ-matrix;
if complete matching is desired and DQ has some zero row
then discard Doc-List;
end;
```

TABLE 6

```
algorithm R(A^t_{x1z}(n,m,i,j,P,DQ;M,V));
V: = 0;
for k:= 1 to n do
    begin
    for l:=(i+1) to n do
        begin
        A^t_{x1z}(n,m,k,l,P,DQ;M',V');
        compute spread D of M';
        if V'/D > V then begin M:=M'; V:=V'/D; end;
        end;
    end;
end.
```

TABLE 7

```
algorithm A^{ab}_{121}(n,m,P,DQ;M,V);
begin
M := 0; V := 0;
(* Iteration for the start positions of intervals *)
for START:=1 to n do
    begin
    MATCH := 0; WEIGHT := 0;
    SUM_WEIGHT := 0;
    FIRST_CANCEL : = false;
    (* Iteration for the ending positions of the intervals *)
    for i:=START to n do (min(START+KS , n))
        begin
        j:= Find_assign(i);
        if L(i,j) > WEIGHT[j]
        then begin
            (* Exchanging of the matching *)
            WEIGHT_SUM := WEIGHT_SUM + (L(i,j)−
            WEIGHT[j]);
            FIRST_CANCEL := (MATCH[j] = START);
            MATCH[j] := i;
            WEIGHT[j] := L(i,j);
            end;
        (* Comparison of the actual matching MATCH with the
        currently optimal matching M *)
        if V < WEIGHT_SUM/(P[START] − P[i]+1)
            and not(FIRST_CANCEL)
        then begin
            (* Better global matching *)
            M := MATCH: V := WEIGHT_SUM/(P[START]−
            P[i]+1);
            end;
        end;
    end;
end.
```

TABLE 8

```
algorithm DAG(n,m,DQ;N,A);
N := {k_{00},k_{n+1,m+1}};
A := ∅;
for each non-zero dq_{ij} do
    N := N u {k_{ij}};
```

TABLE 8-continued

```
    min_s:=m;
for each node k_{ij} do
    for r:=i+1 to n do
        begin
        s:=Next(r,j);
        if s <> 0 then
            begin
            min_s:= min{min_s,s};
            while s ≤ min_s and s <> 0 do
                begin
                A := A u {(k_{ij},k_{rs})};
                s:=Next(r,s);
                end;
            end;
        end;
    end;
end.
```

TABLE 9

```
algorithm A^{abcd}_{321}(n,m,P,DQ;M,V);
begin
V := 0;
COMPLETE := true;
for i:=1 to n−m do
    begin
    S := 0;
    for j:=1 to m do
        begin
        S := S + L(i+j−1,j);
        COMPLETE := COMPLETE and (L(i+j−1,j)<>0);
        end;
    if S > V and COMPLETE then
        begin V:=S;
        START:=i;
        end;
    end;
for j:=1 to m do
    M[i]:=P[START+j];
end.
```

TABLE 10

```
algorithm A^{abcd}_{311}(n,m,P,DQ;M,V);
begin
V := 0;
(* Phase 1 *)
for i:=1 to m−1 do
    begin
    S:= 0; M' := 0;
    for j:=m−i+1 to m do
        begin
        S := S + L(j−m+i,j);
        if L(j−m+i,j) <> 0 then
            M'[j]:= P[j−m+i];
        end;
    if S > V then begin V := S; M := M'; end;
(* Phase 2 *)
for i:=1 to n−m+1 do
    begin
    S:= 0; M' := 0;
    for j:=1 to m do
        begin
        S := S + L(i+j−1,j);
        if L(i+j−1,j) <> 0 then
            M'[j]:= P[i+j−1];
        end;
    if S > V then begin V := S; M := M'; end;
    end;
(* Phase 3 *)
for i:=n−m+2 to n do
    begin
    S:= 0;
    for j:=1 to n−i+1 do
        begin
        S := S + L(i+j−1,j);
        if L(i+j−1,j) <> 0 then
            M'[j]:= P[i+j−1];
        end;
    if S > V then begin V := S; M := M'; end;
    end;
```

TABLE 10-continued end.

We claim:

1. A method implemented in a data processing apparatus for retrieving from among more than one library document those matching the content of a sequence of query words, comprising the steps of:
    (a) defining a set of equivalent words for each of the query words and assigning a word equivalence value to each of said equivalent words; and
    (b) computing a relevance factor for a library document, comprising the steps of:
        (i) locating target sequences of words in the library document that match the sequence of query words, and equivalence thereof, according to a set of matching criteria;
        (ii) evaluating similarity values of said target sequences of words, each similarity value being evaluated as a function of the equivalence values of words included in the corresponding target sequence; and
        (iii) said relevance factor being computed as a function of the similarity values of its target sequences.

2. A method according to claim 1 wherein said function of the equivalence values in step (ii) includes a weighting factor based upon positions in said document of words in said target sequence.

3. A method according to claim 1 wherein said matching criteria include the ordering of a sequence of words in the library document with respect to the sequence of query words.

4. A method according to claim 1 wherein said matching criteria include the completeness of a match between a sequence of words in the library document and the sequence of query words.

5. A method according to claim 1 wherein said matching criteria include the span of a sequence of words in the library document that matches the sequence of query words.

6. A method according to claim 1 comprising the additional step of preselecting a subset of library documents and computing the relevancy factors only for said subset of library documents.

7. A method according to claim 1 wherein said relevance factor of a library document is the similarity value of a target sequence having the highest similarity value.

8. A method according to claim 7 further comprising the step of ranking library documents in order of their respective relevance factors.

9. In a document retrieval system storing more than one library document, an apparatus for retrieving library documents matching the content of a sequence of query words, comprising:
    (a) means for storing a set of equivalent words for each of the query words, each of said equivalent words being stored with a corresponding word equivalence value;
    (b) means coupled to said storage means for computing a relevance factor for a library document, comprising:
        (i) first means for receiving a set of matching criteria;
        (ii) second means coupled to said first means for locating target sequences of words in a library document that match the sequence of query words, and equivalence thereof, according to said matching criteria;
        (iii) third means coupled to said second means for evaluating similarity values of said target sequences of words, each similarity value being evaluated as a function of the equivalence values of words included in the corresponding target sequence; and
        (iv) fourth means receiving said similarity values for computing said relevance factor.

10. The apparatus as in claim 9 wherein said function is said third means includes a weighting factor based upon positions in said document of words in said target sequence.

11. The apparatus as in 9 wherein said matching criteria include the ordering of a sequence of words in the library document with respect to the sequence of query words.

12. The apparatus as in claim 9 wherein said matching criteria include the completeness of a match between a sequence of words in the library document and the sequence of query words.

13. The apparatus as in claim 9 wherein said matching criteria include the span of a sequence of words in the library document that matches the sequence of query words.

14. The apparatus as in claim 9 wherein said relevance factor is the similarity value of a target sequence have the maximum similarity value.

15. The apparatus as in claim 14 further comprising means coupled to said fourth means for ranking library documents in order of their respective relevance factors.

16. The apparatus as in claim 9 further comprising means of preselecting a subset of library documents.

17. A method implemented in a data processing apparatus for retrieving from among more than one library document those matching the content of a sequence of query words, comprising the steps of:
defining a set of equivalent words for each query words and each of said equivalent words being assigned a word equivalence value; and
computing a relevance factor for a library document, comprising the steps of:
    (a) locating target sequences of words in the library document that match the specified sequence of query words according to a set of matching criteria, said matching criteria comprising:
        (i) the ordering of a sequence of words in the library document with respect to the specified sequence of query words;
        (ii) the completeness of a match between a sequence of words in the library document and the specified sequence of query words; and
        (iii) the span of a sequence of words in the library document that matches the specified sequence of query words;
    (b) evaluating similarity values of said target sequences of words, each similarity value being evaluated as a function of the equivalence values of words included in the corresponding target sequence; and
    (c) said relevance factor being computed as a function of the similarity values of its target sequences.

18. A method according to claim 17, wherein a similarity value $S_{xyz}$ is being evaluated according to the equation:

$$S_{xyz}(L1,L2) = \max_{f_{xz}} \left( 1/d(f_{xz}) \sum_{i=1}^{m} s(u_i, v_{f_{xz}(i)}) \right)$$

where
- L1 represents the target sequence;
- L2 represents the sequence of query words;
- x represents said ordering matching criterion;
- y represents said completeness matching criterion;
- z represents said span matching criterion; and $d(f_{xz})$ = $m$ if $y = 1$, and
= max ($m$, spread of $f_{xz}$) if $y = 2$.

19. A method according to claim 17 wherein said relevance factor of a library document is the similarity value of a target sequence having the maximum similarity value.

20. A method according to claim 17 further comprising the step of ranking library documents in order of their respective relevance factors.

* * * * *